United States Patent

Wätterbäck

[11] Patent Number: 5,688,088
[45] Date of Patent: Nov. 18, 1997

[54] DYNAMOMETRIC SCREW OR NUT

[75] Inventor: Paul Gunnar Wätterbäck, Sköldinge, Sweden

[73] Assignee: Excelsior Development Inc., Wilmington, Del.

[21] Appl. No.: 362,569

[22] PCT Filed: Jul. 15, 1992

[86] PCT No.: PCT/SE92/00519

§ 371 Date: May 16, 1995

§ 102(e) Date: May 16, 1995

[87] PCT Pub. No.: WO94/02749

PCT Pub. Date: Feb. 3, 1994

[30] Foreign Application Priority Data

Jan. 16, 1991 [SE] Sweden ............... 9100131

[51] Int. Cl.$^6$ ............ F16B 39/12; F16B 39/284; F16B 39/30; F16B 39/38
[52] U.S. Cl. ............... 411/3; 411/238; 411/931
[58] Field of Search ............... 411/1, 2, 3, 4, 411/5, 6, 237, 238, 243, 396, 397, 403, 931

[56] References Cited

U.S. PATENT DOCUMENTS

| 370,168 | 9/1887 | Truxal | 411/433 |
| 824,983 | 7/1906 | Farrington | 411/403 |
| 1,652,169 | 12/1927 | Fleming | 411/433 |
| 3,667,339 | 6/1972 | Dame | 85/61 |
| 3,841,177 | 10/1974 | Watterback | 411/1 |

FOREIGN PATENT DOCUMENTS

| 0287381 | 10/1988 | European Pat. Off. | F16B 31/02 |
| 79291 | 5/1983 | France | 411/237 |
| 365589 | 3/1974 | Sweden | F16B 31/02 |
| 467797 | 9/1992 | Sweden | F16B 31/02 |
| 2186936 | 8/1987 | United Kingdom | F16B 31/02 |

*Primary Examiner*—Rodney M. Lindsey
*Assistant Examiner*—Robert G. Santos
*Attorney, Agent, or Firm*—Michael D. Bednarek; Fitzpatrick Stockton LLP

[57] ABSTRACT

A torque nut or screw that allows the nut to be tightened to a preset maximum torque, but prevents excess tightening. The nut or screw includes inner and outer threaded elements that extend along the same axis. The outer threaded element is tapered with respect to the axis. The fastener includes an inner fastening member (7) having fastening threads (8) and an outer female member (10) that is rotatable by means of a spanner, a pair of pliers, a screw driver, or other tool. The female member is connected to the inner fastening member by a coupling (13) having a sufficient strength to transfer to the inner fastening member a torque of a magnitude for which the fastening device is designed. The outer female member (10) is designed to be released upon tightening of the coupling and rotated relative to the inner fastening member (7), but not until the predetermined torque is exceeded. The coupling between the outer female (10) and the inner fastening member (7) includes a conical screw coupling.

5 Claims, 2 Drawing Sheets

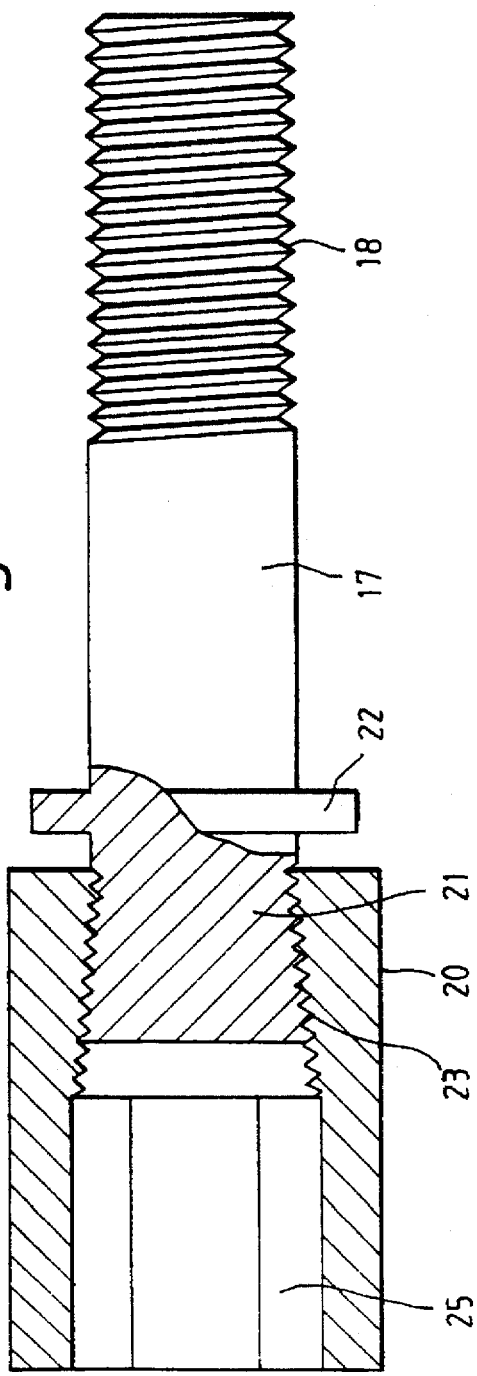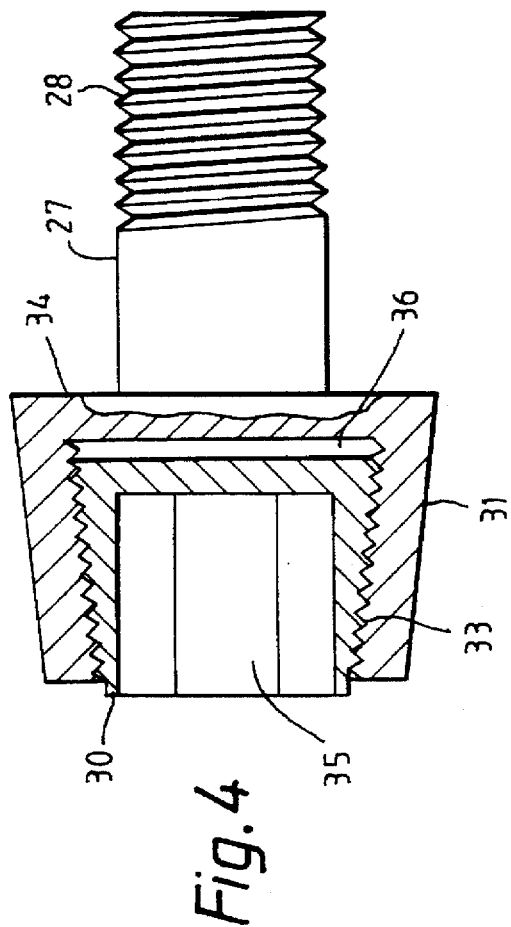

DYNAMOMETRIC SCREW OR NUT

TECHNICAL FIELD

The invention relates to a torque nut or torque screw, i.e. a fastening device with fastening threads, i.e. threads which are operative for the fastening function of the device and with an indication means which is integrated in the device to be released at a predetermined tightening torque, comprising an inner fastening member having said fastening threads and outside of the inner fastening member an outer female member rotatable by means of a spanner, a pair of pliers, a screw driver, or other tool, said female member being connected to the inner fastening member by means of a coupling having a sufficient strength to transfer to the inner fastening member a torque of the magnitude for which the fastening device is designed, and wherein the outer female member is provided, at the tightening of the coupling, to be released and rotated relative to the inner fastening member but not until the predetermined torque is exceeded.

BACKGROUND OF THE INVENTION

It is in many situations desired to be able to tighten nuts and screws with a certain predetermined torque. For this purpose special-type tools have been designed which are released or which are provided with a signalling device, which is released when a set torque has been achieved. These tools, however, are comparatively expensive and are not at hand in normal tool kits. Therefore, there is a need for torque nuts and torque screws which can be tightened by means of conventional tools, such as conventional spanners, pliers, screw drivers and the like, wherein the torque nut and the torque screw, respectively, shall be able to take over the releasing or indication function of the dynamometric tool (torque tool).

BRIEF DISCLOSURE OF THE INVENTION

The purpose of the invention is to provide torque nuts and torque screws which can take over the "indication function" of the dynamometric tool, i.e. which can be tightened with a predetermined torque by means of a conventional tool. This can be achieved therein that the coupling between the outer female member and the inner fastening member consists of a conical screw coupling.

The predetermined torque can be set by a certain tightening of the screw coupling. The outer female member consists of a nut according to a first preferred embodiment of the invention, wherein the predetermined torque is set by a certain tightening of the screw coupling between the outer nut and the inner fastening member. The inner fastening member also may consist of an inner nut, wherein the inner nut, according to an embodiment, may be longer than the outer nut and extend between the outer nut in its two ends.

Further, according to a preferred embodiment, the inner fastening member may have an outwardly directed flange or other abutment means in its outer end, against which abutment means the outer nut is tightly screwed with such a force that the joint between the outer nut and the inner fastening member can be released only by the application of said predetermined torque. The outer end of the inner fastening member, which preferably is designed as a flange, further may have a hexagonal outer cross-section in order to provide lands for a wrench for easing off the inner fastening member when the joint shall be undone. The inner fastening member may also be provided with a hex socket for an Allen key or with grooves for a screw driver in its outer end.

According to a modified embodiment, the fastening member comprises a head designed as a nut with conical threads, the imaginary point of the cone being directed away from the fastening threads of the fastening member. In the said head there is a screw having conical threads cooperative with the conical threads in said head, wherein said screw having conical threads is rotatable by means of a spanner, a pair of pliers, a screw driver or other tool. According to the same principles as for the above described embodiments, said screw having conical threads is joined to the fastening member by a certain tightening of the conical screw joint in order to transfer, to the fastening member, torques of a magnitude for which the fastening member is designed, while said screw having conical threads in said head is provided, when tightening the fastening member, to be released and rotated relative to the fastening member but not until the predetermined torque is exceeded.

Further characteristic features and aspects of the invention will be apparent from the appending claims and from the following description of some preferred embodiments.

BRIEF DESCRIPTION OF DRAWINGS

In the following description of a preferred embodiment reference will be made to the drawings in which

FIG. 3 shows a modification of the embodiment, where the inner fastening member consists of a screw; and FIG. 4 illustrates still another embodiment of the invention.

DESCRIPTION OF PREFERRED EMBODIMENTS

Figure 1:
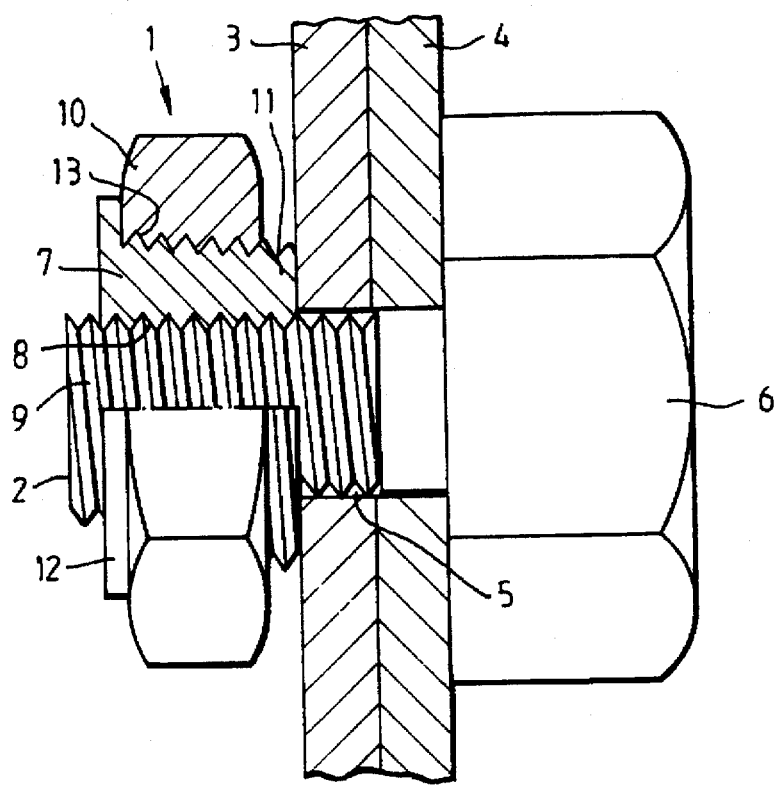
FIG. 1 illustrates, partly in section, a first preferred embodiment in which the inner fastening member consists of a nut.

In FIG. 1 there is shown a screw-nut joint consisting of a torque nut, generally designated 1, and a conventional screw 2. A pair of plates 3, 4 or the like have a through-hole for the screw 2 and are clamped together between the screw head 6 and the torque nut 1.

More particularly, the plates 3, 4 are clamped between the screw head 6 and an inner nut 7, which is included as an inner fastening means in the torque nut 1. The inner nut 7 has normal, straight fastening threads 8, cooperative with the threads 9 of screw 2.

Outside of the inner nut 7, there is an outer female member in the form of an outer nut 10. The inner nut 7 has a longer axial extension than the outer nut 10 and the inner end portion 11 of it abuts the object—the plates 3, 4—which are clamped in the joint. In the opposite end of the inner nut there is a radially—outwardly—directed flange 12, which preferably has a hexagonal section to provide wrench lands for a conventional spanner for the undoing of the joint. The thread 13 between the inner 7 and the outer nut 10 is conical, sloping towards the screw head 6. The threads in the thread coupling 13 are cut in the same direction as the screw threads 9, i.e. are normally right-threaded.

In the torque nut 1, according to the invention, the outer nut 10 is screwed tightly on the inner nut 7, such that it has been brought to close engagement with flange 12, which is possible by a proper dimensioning of the diameters of the two nuts 7, 10 in sections of the thread coupling 13. Thereafter, the nut 10 has been tightened somewhat more against the flange 12. Herein a very favourable development of forces is achieved in the joint between the two nuts 7 and 10 in the torque nut 1.

When operated, the torque nut 1 is screwed on the screw 2 in the normal way, e.g. by means of an adjustable spanner, a monkey wrench, a ring spanner, or other type of open-ended spanner, slip joint pliers or similar tools. When portion 11 is well in engagement with the plate 3, the joint is tightened still more. Finally, when the torque exceeds a certain predetermined torque and the inner nut abut the plate 3 with a predetermined tightness, the outer nut 10 is eased, wherein the joint is prevented from being tightened too much. Due to the fact that the thread coupling 13 is conical there is a correspondence between the easing torque and the torque with which the inner nut 7 and the outer nut 10 initially has been united to each other.

One can thereafter continue the rotation of the outer nut 10 on the inner nut 7 until the outer nut 10 abuts the plate 3, whereafter the joint can be prestressed or locked by increasing the tightening of the outer nut 10. This is possible also by using the conical thread coupling 13 under the condition that the axial displacement and the sloping angle of the cone are comparatively small. According to the preferred embodiment, the sloping angle should be 1°–5°, preferably 1°–3°. It should also be noted that the pitch of thread coupling 13 is substantially smaller than that of the fastening threads 8.

When the joint shall be undone, the inner fastening member, i.e. the inner nut 7, is rotated by means of a conventional tool. If the flange 12 is hexagonal, a conventional spanner can be used. If it is round, various types of pliers can be used.

Figure 2:
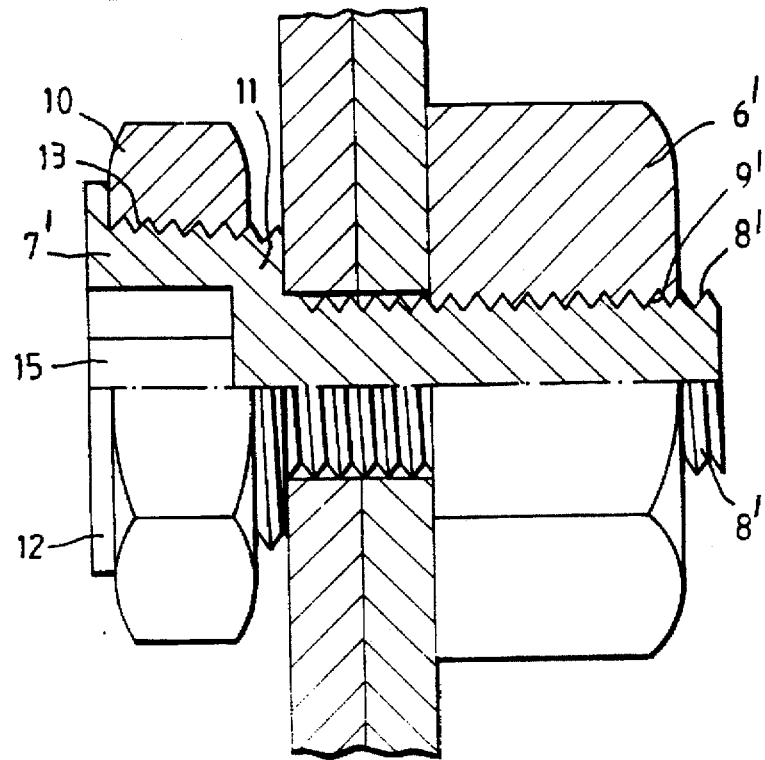
FIG. 2 illustrates a second embodiment, in which the inner fastening member consists of a screw.

In the embodiment shown in FIG. 2, the inner fastening member consists of a screw 7' cooperating with a nut 6'. The screw 7' is provided with fastening threads 8' cooperative with threads 9' in the nut 6'. The outer nut 10 is identical with a corresponding outer nut in the torque nut in the foregoing embodiment. Details having identical correspondences in the above embodiment therefore have been given the same reference numerals. For undoing the joint, the screw 7' is provided with a hex socket 15 for an Allen key. In other respects, the function is analogous with what has been explained with reference to the foregoing embodiment.

In the embodiment of FIG. 3, there is an inner fastening member in the form of a screw 17 cooperating with an outer nut 20. Between a screw head 21 and the nut 20 there is provided a conical thread joint 23. The fastening threads of screw 17 are designated 18. On screw 17 there is also a flange 22 intended to function as an abutment against the object which shall be clamped by means of a screw/nut joint in which the screw 17 forms a part. The flange 22 can be said to correspond to portion 11 at the embodiment according to FIG. 2. According to the embodiment, nut 20, in that end which is opposite of screw 17, has an hex socket 25 for an Allen key. This is used for tightening the joint in the same manner as, according to the embodiment of FIG. 2, is used for gripping the nut 10 by means of an adjustable spanner, ring spanner or the like. In other respects the function is analogous with what has been described with reference to the foregoing embodiments. As far as the conical shape of the screw head 21 is concerned, it should be mentioned that it can be made in situ by means of an upsetting tool which is entered through the hex socket 25.

The embodiment according to FIG. 4 comprises a screw 27 with fastening threads 28 and a screw head 31 designed as a nut. In the nut 31 there is a screw 30 having the same function as the nuts 10 and 20, respectively, according to the foregoing embodiments. Between screw 30 and nut 31 there is a conical thread coupling 33. The conicity is such that the imaginary point of the cone is turned away from the fastening threads 28. In order to rotate the screw 30 there is a hex socket 35 for an Allen key in the screw 30. The surface 34 of the screw head 31 serves as an abutment against a working piece. The internally conical shape of the screw head 31 can be achieved by pressing against the previously arranged screw 30.

When operated, the screw 27 is screwed tight by means of an Allen key in the hex socket 35. When the surface 34 of screw 31 has been brought into contact with the work piece (not shown), the joint is further tightened. Finally, when the torque exceeds a predetermined torque, the inner screw 30 is eased. For this purpose the gap 30 is provided. For undoing the joint, the screw head 31 can be used, which for this purpose is gripped by a suitable tool. The exterior of the screw head 31 for this purpose can be hexagonal or be provided with splines or the like to provide improved wrench lands for a spanner.

I claim:

1. A fastening device with fastening threads that include an integral indication means that is released at a predetermined tightening torque, the fastening device comprising an inner fastening member (7) having said fastening threads (8) formed on the inside of the inner fastening member; an outer female member (10) that is rotatable by means of a tool, said female member being connected to the inner fastening member by means of a coupling (13) having a strength to transfer to the inner fastening member a predetermined torque of a magnitude for which the fastening device is designed, and wherein the outer female member (10) is designed to be released and rotated relative to the inner fastening member (7) upon tightening of the coupling to a degree that exceeds the predetermined torque, and wherein the coupling between the outer female member (10) and the inner fastening member comprises a conical screw coupling, and wherein the outer female member comprises a nut having a conically threaded hole that extends from a first side of the nut to a second side of the nut, said inner fastening member extending beyond said second side of the nut, and wherein the predetermined torque is set by a certain tightening of the screw coupling between the outer nut (10) and the inner fastening member (7).

2. Fastening device according to claim 1, wherein the inner fastening member is an inner nut (7), and the inner nut (7) is longer than the outer nut (10).

3. Fastening device according to claim 1, wherein the conically threaded hole in the female member has two ends and the hole includes a thread that extends from one end of the hole to the other end of the hole.

4. Fastening device according to claim 1, wherein the inner fastening member includes a radially outward extending flange that has a maximum radial dimension and wherein the outer female member has a maximum radial dimension that exceeds the maximum radial dimension of the flange so that the outer member may be readily engaged by a tool for tightening.

5. Fastening device according to claim 2, wherein the inner nut has two ends, and both of its ends extend beyond the outer nut, and wherein the outer end of the inner nut has an outwardly directed abutment (12) against which the outer nut (10) abuts and is tightly screwed with such a force that the joint between outer nut and the inner fastening member can be released only by the application of the said predetermined torque.

* * * * *